June 2, 1925.
C. A. PARKER
HOSE CLAMP
Filed June 9, 1924
1,540,084
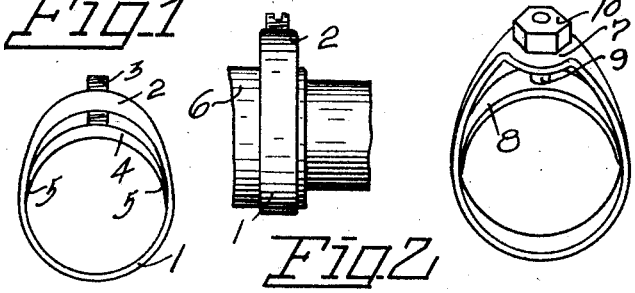
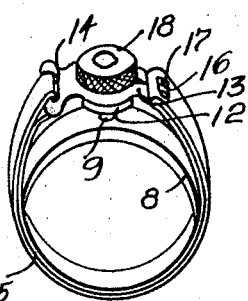
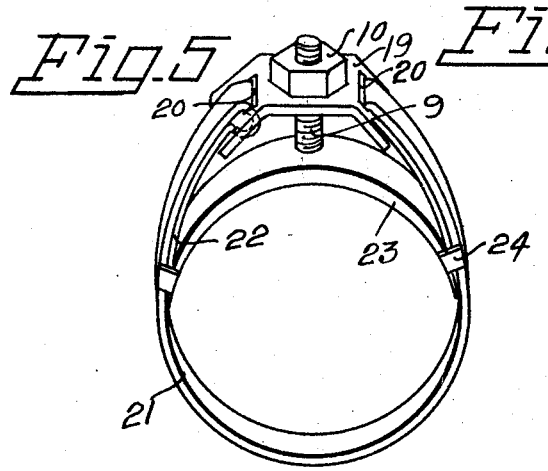
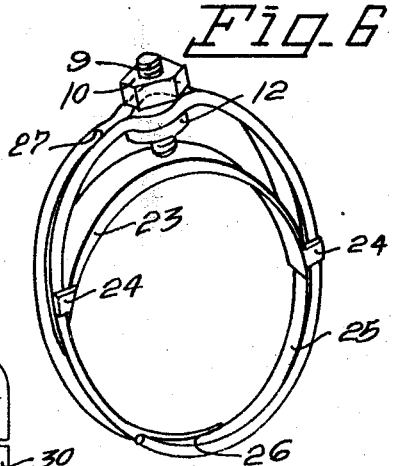
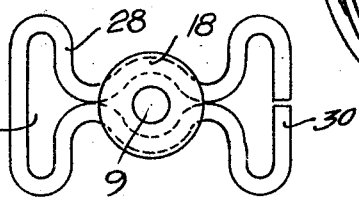
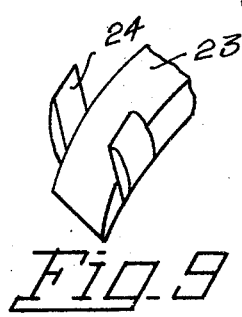
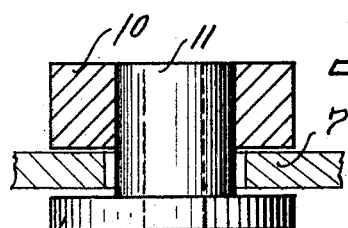
Inventor
Charles A. Parker
By Herbert E. Smith
Attorney Patented June 2, 1925.

1,540,084

UNITED STATES PATENT OFFICE.

CHARLES A. PARKER, OF HAUGAN, MONTANA, ASSIGNOR OF ONE-HALF TO WILLIAM H. LOGAN, OF ST. REGIS, MONTANA.

HOSE CLAMP.

Application filed June 9, 1924. Serial No. 718,777.

*To all whom it may concern:*

Be it known that I, CHARLES A. PARKER, a citizen of the United States, residing at Haugan, in Mineral County and State of Montana, have invented certain new and useful Improvements in Hose Clamps, of which the following is a specification.

My present invention relates to improvements in hose clamps for use in connection with various forms of hose, as for instance garden hose, water connections for automobiles, air hose and various other connections where a clamp involving the use of a clamp ring and clamp plate or compression plate are used.

The primary object of the invention is the provision of a clamp device that is simple in construction and operation, comparatively inexpensive in cost of production, durable, and efficient in the performance of its functions.

These and other objects are attained by combining and arranging the clamp ring, clamp plate, and compression device in such novel forms as will hereinafter be more fully set forth and claimed.

In the accompanying drawings I have illustrated several forms of the physical embodiment of my invention wherein the parts are combined and arranged in accordance with the best modes I have thus far devised for the practical application of the principles of my invention.

Figures 1 and 2 are respectively a face view and an edge view of one form of my invention using a loose screw in connection with the compression plate and clamp ring.

Figure 3 is a view in perspective of a form of the device using a non-traveling, rotatable nut in connection with the threaded pin or screw attached to the compression or clamp plate.

Figure 4 is a perspective view of the hose clamp using a special form of bearing head in connection with the clamp ring for the clamp nut.

Figure 5 is a perspective view illustrating a slightly modified form of bearing head for the clamp ring.

Figure 6 is a perspective view showing a modified form of the clamp ring made of a piece of wire and welded together.

Figure 7 is an enlarged, top plan view of a wire bearing head showing the relation thereto of the threaded pin or stud and nut.

Figure 8 is an enlarged, detail view partly in section showing the clamp nut of Figure 3.

Figure 9 is a perspective view of a portion of a clamp plate as shown in Figures 5 and 6.

In the form of the invention shown in Figures 1 and 2 the clamp ring 1 is an integral band to encircle the hose and is fashioned with an offset, thickened bearing head 2 which is perforated and threaded for the clamp screw 3 that passes therethrough and engages the outer face of the clamp plate 4. The clamp plate is located within the clamp ring 1 and its inner face is complementary to the friction face or inner face of the clamp ring to insure a continuous frictional engagement with and pressure on the periphery of the hose with which the clamp is used. The ends of the crescent shaped clamp plate are thinned as at 5 in order that the frictional faces of the plate and ring may merge and present a substantially smooth annular friction face on the hose 6.

In Figures 3 and 8 a modified form of the invention is disclosed wherein the bearing head 7 is of substantially the same thickness as the clamp ring with which it is formed integral, and the crescent shaped clamp plate 8 is also shown as of a thickness corresponding to the clamp ring. The bearing head is offset from the clamp ring, and the screw or stud 9 which is fixed to or integral with the clamp plate projects through the bearing head, but does not contact therewith. A non-traveling rotatable nut 10 having an interiorly threaded bushing 11 is rotatable in the perforated head 7, as seen in Figure 9, for compressing the clamp plate on the hose in connection with the clamp ring that encircles the hose. The bushing is fashioned with an annular flange 12, and the nut portion 10 is welded to the exterior of the bushing. The flange and the nut portion are spaced apart so that the bushing will turn within the perforated bearing head and the nut which is free to turn in the head is prevented from traveling. By turning the nut of course the clamp plate is compressed on the exterior of the hose.

In Figure 4 the clamp head or bearing head 13 which is slotted at 14 is a separate member from the clamp ring 15 which is made up of a double thick metal plate having a bend in the slot 14. The other end of this double thick or two ply ring is slotted as at 16 to hook over the hook 17 of the bearing head located diametrically opposite the slot 14 of the bearing head.

The non-traveling nut 18 is retained on the threaded stud 9 of the clamp plate 8 in manner similar to that of the nut 10 in Figures 3 and 9.

Another type of bearing head is illustrated in Figure 5 where the perforated bearing head 19 is fashioned with a pair of angular, slotted flanges 20, and the ends of the metal strap forming the clamp ring 21 are passed through these slotted flanges. As indicated at 22 these ends of the clamp ring material lie close to and conform to the inner face of the clamp ring, and terminate just above the clamp plate 23. The clamp plate as best seen in Figure 9 is fashioned with side lugs 24, located near its ends, and projecting from its sides. These opposed lugs at each end of the plate extend over and engage the opposite edges of the clamp ring and hold the plate within the ring against displacement.

In some instances the clamp ring may be fashioned from wire stock as indicated at 25 in Figure 6, the strands of the wire being spaced apart to form the bearing head, and welded or brazed at points as 26 and 27 to strengthen and brace the structure. The clamp plate 23 is similar to the one illustrated in Figure 5, and the non-traveling rotatable nut 10 is the same as in Figures 3, 5, and 9.

Under some conditions the bearing head used in the structure of Figure 5 may be fashioned from wire as indicated at 28 in Figure 7. Here the head is fashioned of a single piece of wire to accommodate the clamp nut as 18 on the threaded stud 9 and at opposite sides of the head loops 29 and 30 are formed through which the ends of the clamp ring 21 are passed and anchored.

The ring and plate in all forms of the device, together provide an annular clamping surface for the hose about which the compression is uniformly distributed through the action of the clamp nut or screw, and the thinned ends of the clamp plate insure a merging of the contact faces of the plate and ring to form a continuous compression surface around the hose thus preventing leakage of fluid or liquid from the hose joint.

Having thus fully described my invention what I claim as new and desire to secure by Letters Patent is—

1. The combination with a clamp ring having a bearing head, of a clamp plate within the ring and a threaded stud on said plate, a nut in said head for the threaded stud, said nut comprising a threaded bushing having an annular flange within the head, and a head on the bushing at the outer side of the bearing head.

2. The combination with a clamp ring of a slotted bearing head adapted to receive the ends of said ring and retaining means therefor, a clamp plate and threaded stud, a nut in the bearing head for said stud, and means for retaining said nut in said head.

3. The combination with a clamp ring of a bearing head and means for attaching the ends of said ring to said head, of a clamp plate having pairs of oppositely disposed retaining lugs engaging said ring, a threaded stud on said plate, a nut in the head engaging said stud, and means at the outer and inner sides of said head for retaining the nut on the said head.

4. The combination with a clamp ring of a bearing head and means for attaching the ends of said ring to said head, a clamp plate having pairs of oppositely disposed retaining lugs engaging said ring, a threaded stud on the plate, a nut in the head engaging said stud, said nut comprising a threaded bushing rotatable in the head and fashioned with an inner annular flange, and an outer head on said nut.

In testimony whereof I affix my signature.

CHARLES A. PARKER.